(12) United States Patent
Bredemeier et al.

(10) Patent No.: US 10,822,115 B2
(45) Date of Patent: Nov. 3, 2020

(54) RETROFITTABLE DISPLAY DEVICE FOR DISPLAYING AN ACTIVATION STATUS OF AN EMERGENCY CHUTE IN AN AIRCRAFT

(71) Applicant: AIRBUS OPERATIONS GMBH, Hamburg (DE)

(72) Inventors: Kai Bredemeier, Hamburg (DE); Carsten Heuer, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 96 days.

(21) Appl. No.: 16/147,151

(22) Filed: Sep. 28, 2018

(65) Prior Publication Data

US 2019/0039748 A1 Feb. 7, 2019

Related U.S. Application Data

(63) Continuation of application No. PCT/EP2016/057444, filed on Apr. 5, 2016.

(51) Int. Cl.
| | |
|---|---|
| *B64D 45/00* | (2006.01) |
| *B64C 1/14* | (2006.01) |
| *B64D 25/14* | (2006.01) |
| *B64D 47/02* | (2006.01) |
| *G01S 15/08* | (2006.01) |
| *G08B 7/06* | (2006.01) |

(52) U.S. Cl.
CPC ........ *B64D 45/0005* (2013.01); *B64C 1/1407* (2013.01); *B64D 25/14* (2013.01); *B64D 47/02* (2013.01); *G01S 15/08* (2013.01); *G08B 7/06* (2013.01); *B64D 2045/007* (2013.01)

(58) Field of Classification Search
CPC combination set(s) only.
See application file for complete search history.

(56) References Cited

U.S. PATENT DOCUMENTS

| | | | |
|---|---|---|---|
| 3,463,287 A * | 8/1969 | Smith | A62B 1/20 193/25 B |
| 4,797,657 A | 1/1989 | Vorzimmer et al. | |

(Continued)

FOREIGN PATENT DOCUMENTS

| | | |
|---|---|---|
| DE | 19909953 A1 | 9/2005 |
| EP | 0321994 A2 | 6/1989 |

(Continued)

OTHER PUBLICATIONS

European Patent Office, Search Report for International Application PCT/EP2016/057444 dated Jan. 4, 2017.

*Primary Examiner* — Travis R Hunnings
(74) *Attorney, Agent, or Firm* — Greer, Burns & Crain, Ltd.

(57) ABSTRACT

A display device for displaying an activation status of an emergency chute in an aircraft has an optical display device, an acoustic signal device, a sensor for sensing proximity of a person to the display device, and an electronic unit. The electronic unit is configured to operate the optical display device or the acoustic signal device when the detected proximity of a person is less than a predetermined limit distance. The optical display device, the acoustic signal device, the sensor, and the electronic unit form a compact unit that can be integrated into a door panel of an aircraft door.

12 Claims, 4 Drawing Sheets

(56) References Cited

U.S. PATENT DOCUMENTS

| | | | | |
|---|---|---|---|---|
| 6,676,082 | B2* | 1/2004 | Alberts | A62B 1/20 244/137.2 |
| 9,469,413 | B2* | 10/2016 | Waigl | B64C 1/1423 |
| 9,720,011 | B2* | 8/2017 | Riedel | B64D 25/14 |
| 2003/0080254 | A1* | 5/2003 | Alberts | B64D 25/14 244/137.2 |
| 2008/0048889 | A1 | 2/2008 | Naegler et al. | |
| 2008/0284619 | A1* | 11/2008 | Farmer | B64C 1/1407 340/963 |
| 2011/0139934 | A1* | 6/2011 | Giesa | B64D 25/14 244/137.2 |
| 2014/0345396 | A1* | 11/2014 | Riedel | B64D 25/14 73/865.4 |
| 2016/0019770 | A1* | 1/2016 | Bredemeier | B64C 1/1423 244/129.5 |
| 2017/0050744 | A1* | 2/2017 | Bredemeier | B64C 1/1407 |

FOREIGN PATENT DOCUMENTS

| | | |
|---|---|---|
| EP | 2108585 A1 | 10/2009 |
| EP | 2878530 A1 | 6/2015 |
| EP | 2974963 A1 | 1/2016 |
| FR | 2644611 A1 | 9/1990 |
| WO | 2005083647 A1 | 9/2005 |

\* cited by examiner

RETROFITTABLE DISPLAY DEVICE FOR DISPLAYING AN ACTIVATION STATUS OF AN EMERGENCY CHUTE IN AN AIRCRAFT

CROSS-REFERENCE TO PRIORITY APPLICATION(S)

This application is a continuation of international patent application number PCT/EP2016/057444, having an international filing date of Apr. 5, 2016. The content of the referenced application is incorporated by reference herein.

TECHNICAL FIELD

Embodiments of the invention relate to a display device for displaying an armed state of an emergency slide in an aircraft, a method for displaying an armed state of an emergency slide, and an aircraft comprising at least one emergency slide and a display device for displaying an armed state of the at least one emergency slide.

BACKGROUND

In larger passenger aircraft, aircraft doors are coupleable to an emergency slide triggering device such that, when the relevant aircraft door is opened, an emergency slide arranged thereon is triggered. To this end, an emergency slide arming lever is pushed into an "armed" mode prior to takeoff, once the doors are closed. After a normal landing, the emergency slide arming lever is pushed into a "disarmed" mode such that a coupling with the emergency slide triggering device is lifted and the aircraft doors can be opened normally.

The position of the emergency slide arming lever is optically clearly identifiable. Additionally, a warning lamp can be installed in or on the aircraft door, said warning lamp facilitating an optical display of the state of the emergency slide arming. Nevertheless, the emergency slide arming lever may be occasionally left in the "armed" state after a successful landing on account of time pressure and unpredicted situations on board the aircraft, and an emergency slide is inadvertently triggered when opening an aircraft door, leading to damage in the surroundings of the aircraft and high consequential charges on account of the necessary reintegration of the emergency slide. This is independent of the door design and the aircraft manufacturer.

There are solutions which prevent inadvertent triggering of emergency slides, for example by devices that detect the approach of the person to an aircraft door and that emit an optical and/or acoustic warning if a person approaches the door or touches the handle when the emergency slide arming device is coupled to the aircraft. Such a solution may require a modification of the aircraft door.

BRIEF SUMMARY

It is the object of the disclosure to propose an effective device for displaying an armed state of an emergency slide and for preventing inadvertent triggering of same, the device being particularly reliable and easily retrofittable, with, where possible, no relatively large modifications being required within the relevant aircraft and, in particular, within a door.

This object is achieved by a display device having the features of independent claim 1. Developments and advantageous embodiments can be gathered from the dependent claims and the following description.

A display device for displaying an armed state of an emergency slide in an aircraft is proposed, the display device comprising an optical display device for outputting an optical signal, an acoustic signaling device for outputting an acoustic signal, a sensor for detecting the approach of a person to the display device and an electronics unit that is coupled to the optical display device, the acoustic signaling device and the sensor and that is configured to operate at least one of the optical and the acoustic signaling device when a person approaches to within at least a predetermined threshold distance. The optical display device, the acoustic signaling device, the sensor and the electronics unit further form a contiguous, compact component that is integrable in a door panel of the aircraft.

The optical display device serves to produce an optically perceivable signal which indicates to the person that an emergency slide is triggered when a door of the aircraft is opened. Arbitrary display devices can be used to produce this signal, said display devices, in particular, selectively generating a light signal, for example by way of a lighting device on the basis of an incandescent lamp, an LED or a plurality thereof. To this end, the lighting device can be configured to emit a continuous light or a flashing light, wherein the optical perceivability of a flashing light can exceed that of a continuous light.

Analogously thereto, the acoustic signaling device can have a sound production unit, by means of which an acoustically perceivable signal can be produced. To this end, the sound production unit may have a loudspeaker or buzzer that is operable electromagnetically or piezo-electrically and, if required or desired, a device for selective emission of a signal sequence for playing back a recorded or synthetic tone.

Further, the sensor is capable of determining an approach of a person to the sensor and consequently to the display device housing the latter, and so it is possible to obtain knowledge about whether, and/or at what distance, a person is situated in front of the sensor. On the basis of information established by the sensor, the electronics unit coupled therewith is able to selectively operate the optical display device and the acoustic signaling device. Specifically, this means that the electronics unit can emit an optical and/or acoustic warning signal on the basis of the distance of a person from the sensor or the display device, said warning signal notifying the person that triggering the emergency slide should be expected when the door is opened.

As a result of embodying the display device as a compact component, which is integrable in a door panel of the aircraft, for instance in a window funnel of a door window, it is consequently readily possible to replace a conventional warning lamp for emergency slide arming, which is usually arranged there, with the display device according to the disclosure. Preferably, the display device should be designed in such a way that it is designed like a conventional warning lamp, at least in a region required for the fastening, such that the door panel and a corresponding section or a fastening means arranged thereon need not be modified. Consequently, the display device according to the disclosure has a very high potential for a retrofitting solution (retrofit) because only a conventional warning light would have to be replaced by the display device according to the disclosure.

Preferably, the display device comprises a housing with a fastening region and a viewing side. The fastening region is configured to engage in a mechanical connection with the door panel or a fastening means at the aircraft door. The optical display device and the sensor extend at least in part toward the viewing side. Arranging the optical display device in a region in the proximity of the viewing side allows an unimpeded perception of the optical signal produced by the optical display device. Moreover, the sensor is preferably arranged in a viewing-side-proximate region in order to facilitate unimpeded monitoring of a detection or monitoring region situated in front of the display device, and hence in front of the door panel in the interior of the aircraft. This monitoring region is defined as a spatial portion situated in front of the aircraft door or as an area of a floor situated in front of the door panel by way of the selection and fine-tuning of the sensor and it extends into the interior of the aircraft, i.e., into a region facing away from the door panel. In order to allow unimpeded perception of the optical signal and unimpeded monitoring, the sensor and the optical display device can be arranged next to one another or above one another on the viewing side.

In an advantageous embodiment, the sensor is an ultrasonic sensor. The latter can periodically emit an acoustic signal in the ultrasonic range which is reflected by objects situated in the detection or monitoring region and cast back to the sensor. The distance of the object from the sensor can be established from the time difference between the emitted and incoming signal. Such sensors are sophisticated, easily available commercially and cost-effective. Moreover, ultrasonic sensors have a comparatively low weight that nevertheless allows a precise measurement and an adjustable sensor behavior.

Preferably, the electronics unit has at least one armed signal input and is configured to activate or interrupt the operation of the optical display device and the acoustic signaling device on the basis of an armed signal that is receivable by way of the armed signal input. In this way, the electronics unit can make the operation of the optical display device and of the acoustic signal device dependent on the landing state of the aircraft and/or the position of an emergency slide arming lever situated at the relevant door. This is advantageous in that corresponding monitoring is only undertaken in the case of the aircraft having landed and the emergency slide arming lever being in a certain position, when there may be the risk of the door being opened without the emergency slide arming lever being disarmed. During regular flying operation, by contrast, it is possible to dispense with monitoring as there is no risk of a door being opened in that case. An armed signal that depends on the landing state of the aircraft can be generated by a separate device when the aircraft is on the ground and can be transmitted to the armed signal input. An armed signal that depends on the position of an emergency slide arming lever can be generated by a further sensor, which is arranged in or at the emergency slide arming lever, which monitors the position of the emergency slide arming lever and which transmits a corresponding signal to the at least one armed signal input.

An armed signal that depends on the landing state of the aircraft can be generated and emitted by a central system of the aircraft that is already present. Connecting the display device according to the disclosure to this central device via an appropriate bus or a network, e.g., via AFDX, CAN or the like, lends itself to this end. The precondition to this end is that a corresponding data line is present in the door or subsequently integrated therein. However, a wireless connecting device or a data transmission system realized on the basis of the current line extending into the door could also be used to this end.

In a further embodiment, the display unit further comprises an inertial measurement unit, coupled to the electronics unit, comprising at least one inertial sensor for continuous or periodic detection of at least one directed acceleration, wherein the electronics unit is configured to determine whether the aircraft is on the ground from the detected at least one directed acceleration. Here, an inertial sensor could detect both an acceleration along one of three spatial axes and a rotational acceleration about one of three spatial axes. The movement of the aircraft can be tracked by using at least one inertial sensor; from this, it is possible to deduce whether the aircraft is on the ground or in flight. Different methods could be used to this end. By way of example, a flight profile can be detected by continuously tracking the movements of the aircraft, said flight profile consisting of an ascent phase, a cruising flight at one or more cruising flight levels, a descent phase and a subsequent rolling phase, in which the aircraft is decelerated strongly and an acceleration in the vertical direction is negligible. It would also be possible to determine only a characteristic landing impact, which follows a descent phase, and/or a clear deceleration in the longitudinal direction of the aircraft. The different methods may require different arrangements with a different number of inertial sensors; for instance, a single inertial sensor that detects the acceleration along the vertical axis of the aircraft could suffice when determining a landing impact. However, using commercially available and preferably standardized three-axis or six-axis sensors, which are able to detect both static positions and dynamic changes in positions and, for instance, which are realized with in each case three-axis-rate sensors and three-axis-acceleration sensors on a chip, lend themselves particularly to this end. Consequently, the display device itself determines whether the aircraft is on the ground. Consequently, a connection to a bus or a network, which may not be present in the door or door panel, need not be retrofitted, and so the display device is usable in a very flexible manner for very different aircraft types and aircraft doors.

Further, it is advantageous to equip the display device and/or the inertial measurement unit with a device for predetermining a flight direction depending on the fuselage side of the corresponding aircraft door, i.e., a right or left fuselage side. Designing the display device as a component that is always the same and integrable into many different aircraft doors lends itself in this respect. Accordingly, the inertial measurement unit integrated in the display device can be aligned in two different ways in relation to the flight direction. The installation side of the display device in relation to the flight direction therefore needs to be known in order to be able to reliably identify the landing state of the aircraft using the signals supplied by the inertial measurement unit. In addition to the "factory" setting by way of appropriate firmware in the electronics unit, predetermining this with the aid of bridgeable pins at the electronics unit, i.e., pin programming, may also lend itself to this end when installing the display device.

In a further advantageous embodiment, the electronics unit is configured to operate the optical display device when a person approaches to within a first threshold distance and operate the acoustic signaling device when a person approaches to within a second threshold distance, wherein the first threshold distance is greater than the second threshold distance. Should a person approach the display device, the latter can initially output an optical signal, for example, and so the person is already informed at a relatively large distance, i.e., significantly more than one arm length, preferably at most 1.1 m, that the emergency slide is armed. If the person approaches to within the second threshold distance, which, e.g., lies at less than one or one and a half arm lengths, preferably at most 0.5 m, an acoustic signal can be additionally output, said acoustic signal explicitly notifying the person that the emergency slide is triggered when the handle is actuated.

The housing of the display device according to the disclosure can be transparent, at least in part in a portion housing the optical display device. Therefore, the housing form need not different from that of a conventional warning lamp and the components integrated therein are largely protected from outer influences, with the visibility of the optical display device remaining ensured.

The disclosure further relates to a method for displaying an armed state of an emergency slide in an aircraft, said method comprising the steps of detecting a distance of a person from a display device in a door panel of an aircraft, comparing the distance to at least one threshold distance, and operating at least an optical display device and an acoustic signaling device as soon as the at least one threshold distance is undershot.

In an advantageous embodiment, the optical display device is operated when a person approaches to within a first threshold distance and the acoustic signaling device is operated when a person approaches to within a second threshold distance, wherein the first threshold distance is greater than the second threshold distance.

Further, the electronics unit can suppress the operation of the at least one optical display device and the acoustic signaling device as soon as no armed signal is received at at least an armed signal input. As mentioned above, this may be a signal that is dependent on the landing state and/or a signal that is dependent on the position of an emergency slide arming lever.

Further, in the method, at least one directed acceleration can be detected continuously or periodically by at least one inertial sensor by way of an inertial measurement unit that is coupled to the electronics unit and that is arranged in the display device, and whether the aircraft is on the ground can be determined from the detected at least one directed acceleration and, should the aircraft be on the ground, an armed signal can be produced and transmitted to the electronics unit. As mentioned above, the inertial measurement unit preferably has a three-axis sensor or a six-axis sensor.

Further, the disclosure relates to an aircraft comprising at least one door and a door panel attached thereto in the interior of the aircraft, and, on the door panel, a display device having the features specified above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

Further features, advantages and applications of the present disclosure emerge from the following description of the exemplary embodiments and the figures. Here, all described features and/or all features presented in pictorial fashion form the subject matter of the disclosure, both on their own and in any combination, also independently of their composition in the individual claims or their dependency references. Furthermore, the same reference signs represent the same or similar objects in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
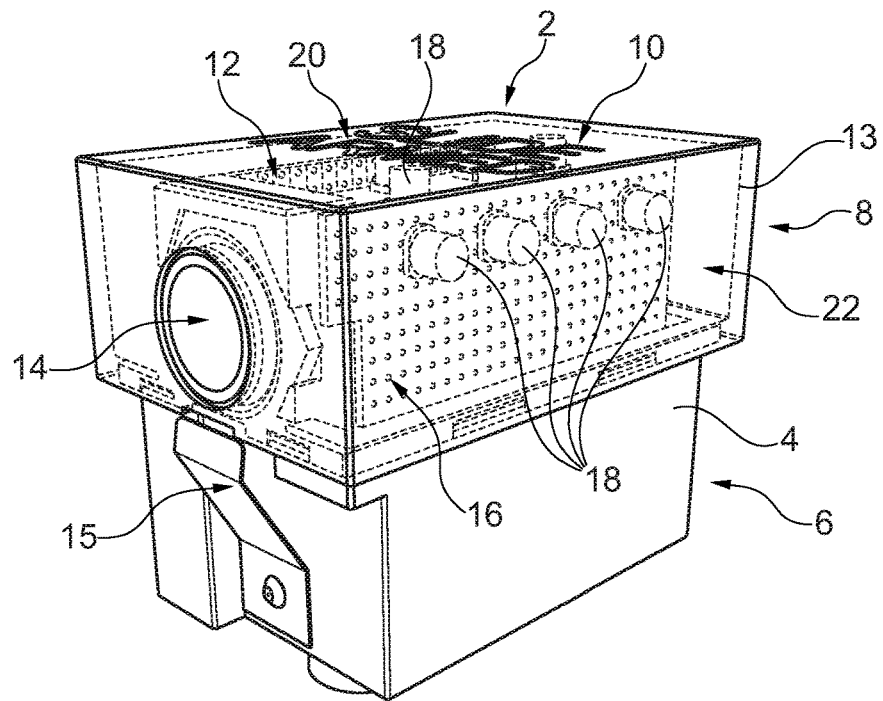
FIG. 1 shows a display device and a three-dimensional view.

FIG. 1 shows a display device 2 according to an exemplary embodiment of the invention, comprising a housing 4 with a fastening region 6 and a viewing side 8. Arranged in the display device 2, there is an optical display device 10, which has a plurality of lighting devices 18 in an exemplary manner, an acoustic signaling device 12 that is covered in FIG. 1 and a sensor 14 for detecting the distance of an object from the display device 2. In an exemplary manner, the optical display device 10 and the sensor 14 are arranged one above the other or one next to one another, i.e., successively along a spatial axis, on the viewing side 8, while the acoustic signaling device 12 is positioned in an exemplary manner in the interior of the display device 2, distant from the viewing side 8. Furthermore, the fastening region 6 may have elastic holding clamps 15, which, when the fastening region 6 is inserted into a corresponding opening of a door panel, enter into an interlocking and/or force fit connection with the latter.

Figure 2:
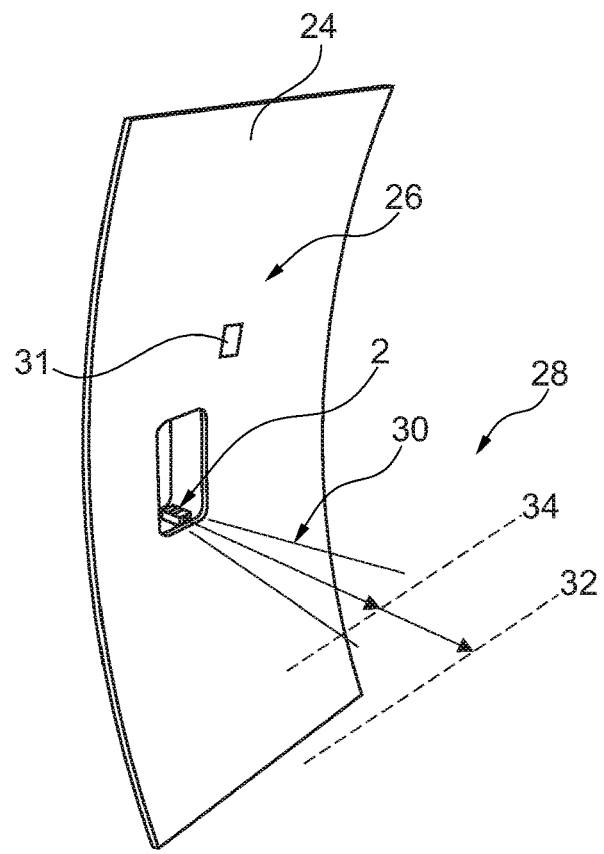
FIG. 2 shows a possible installation position of the display device.

An electronics unit 16 that is furthermore arranged in the display device 2, a printed circuit board thereof being identifiable in this illustration in particular, is connected to the optical display device 10, the acoustic signaling device 12 and the sensor 14 and configured to selectively operate the optical display device 10 and the acoustic signaling device 12 on the basis of the detected distance of an object from the display device 2 or the sensor 14. By way of example, this can be achieved by defining at least one threshold distance 32, 34 as shown in FIG. 2, an object at most being allowed to reach said threshold distance such that the optical display device 10 and/or the acoustic signaling device 12 is/are operated.

The electronics unit 16 can have an armed signal input, with it being possible to send an armed signal thereto. Said armed signal is used to only undertake the initiation of the operation of the optical display device 10 and the acoustic signaling device 12 once the aircraft is situated on the ground and the associated aircraft door can be opened at any point.

In the shown exemplary embodiment, the optical display device 10 is only separated by a transparent cover 13 from the viewing side 8 or it is arranged in a cutout arranged therein such that an unimpeded visibility of the optical display device 10, i.e. of the lighting devices 18, is permitted, said lighting devices 18 being suitable for producing a sufficiently bright light, either in pulsed or continuous fashion. Moreover, the optical display device 10 has lettering 20 ("Slide Armed") in exemplary fashion, said lettering 20 being configured as only the light-opaque area of the optical display device 10. As an alternative thereto, the lettering 20 can also be realized as the only area of the optical display device 10 that passes light.

In exemplary fashion, the sensor 14 is an ultrasonic sensor which periodically emits ultrasonic signals and determines the distance to the relevant object situated in front of the sensor from the time difference between the emitted sound waves and the received sound reflections. As an alternative thereto, it is also possible to use other types of sensors, for example optical, camera-based or radar-based sensors.

The display device 2 is embodied as a very compact component that can be used instead of a conventional warning lamp in a door panel or the like. As indicated above, only operating the optical display device 10 and/or the acoustic signaling device 12 when the aircraft is on the ground and opening of the aircraft door is imminent lends itself to avoiding excessive triggering of warning signals of optical or acoustic nature. This can be realized particularly easily by receiving an armed signal at the armed signal input, although this requires a data line to a central unit on board of the aircraft.

In the shown embodiment of the display device 2, an inertial measurement device (inertial platform or IMU) 22, which is covered here, is integrated therein, said inertial measurement device being configured to detect the spatial movements of the aircraft and transmit these to the electronics unit 16. An aircraft landing can be determined by concise events, for example a landing impact after a continuous descent, with the detected height of the aircraft after a carried-out landing impact practically no longer changing. Once this event has occurred, the electronics unit 16 can undertake the monitoring and optical or acoustic warnings controlled thereby.

In an exemplary manner, FIG. 2 shows an aircraft door 24 comprising a door panel 26, which faces the interior of the aircraft fuselage. If the aircraft situated on a taxiway or in a park position, the door 24 is opened from the interior of the aircraft. The display device 2 is integrated at or in the door panel 26, for example in a window funnel of a door window, with the viewing side 8 of the display device 2 facing the interior of the aircraft.

Consequently, if a person is situated in front of the door 24, said person is in the detection region of the sensor 14. As indicated, the sensor 14 monitors a space 28 on the inner side of the aircraft and defines a detection region 30 there. By way of example, the electronics unit 16 can define a first threshold distance 32 and a second threshold distance 34, with the electronics unit 16 operating the optical display device 10 as soon as a person approaches to within the first threshold distance 32 and the acoustic signaling device 12 being operated as soon as a person approaches to within the second threshold distance 34. Providing a distance of at most 1.1 m and preferably 0.9 m lends itself to the first threshold distance 32. A distance of at most 0.5 m and preferably 0.35 m lends itself to the second threshold distance 34.

If a person is situated between the two lines indicating the threshold distances 32 and 34, they are only made aware of the emergency slide still being armed by way of optical means, for example by a flashing light. If the person comes closer to the door 24, there is additional acoustic signaling if the distance to the door 24 is near an arm's length. Naturally, the two threshold distances 32 and 34 can also be the same, and so there is simultaneous optical and acoustic signaling.

Figure 3:
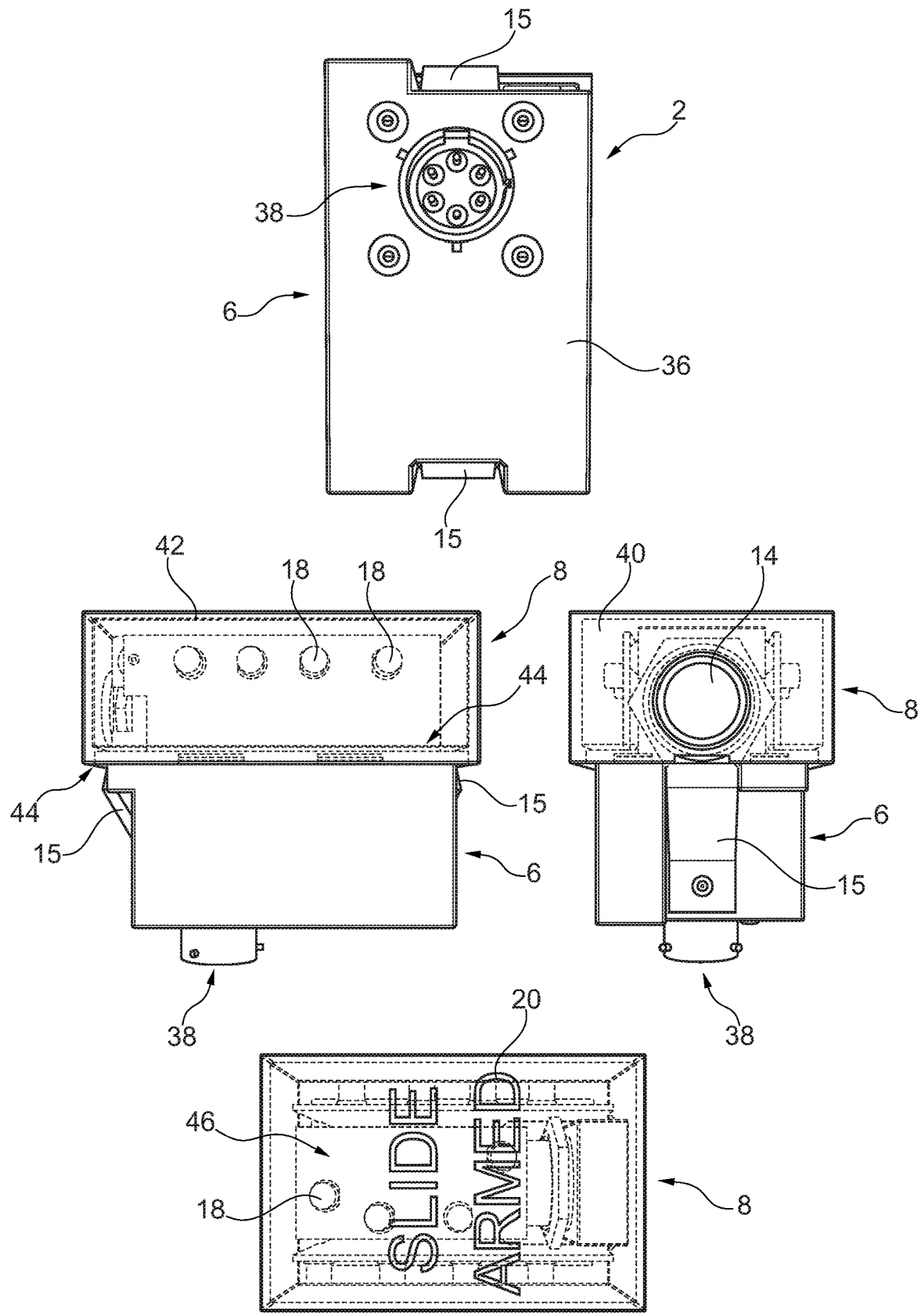
FIG. 3 shows the display device in a four-side view.

FIG. 3 shows a four-side illustration of the display device 2, in which a lower side 36 with an electrical connector 38 is shown, the latter intended for connection to the power supply of the door 24 and furthermore being coupled to a sensor (not illustrated), which monitors the emergency slide arming lever 31. This can be realized both by way of an armed signal that is dependent on the position of the emergency slide arming lever 31 and by way of a power supply that is dependent on the position of the emergency slide arming lever 31.

A narrow end 40 of the viewing region 8 mainly comprises the sensor 14, which is directed directly into the interior of the aircraft fuselage in the case of an installation as shown in FIG. 2. The lighting devices 18 are identifiable on a side wall 42, said lighting devices 18 being distributed along the side wall 42 in the interior of the cover 13. The fastening region 6 is designed to be narrower than the viewing region 8 such that, when the display device 2 has latched into an opening, an edge 44 facing the fastening region 6 can lie on a rim of the relevant opening and the holding clamps 15 promote a flush contact of the edge 44 with the rim of the relevant opening.

The lettering 20 is arranged on an upper side 46 and, there, it substantially assumes the available width of the cover 13. As a result of the transparency of the cover 13, further lighting devices 18, which back-illuminate the lettering 20, are identifiable.

Figure 4:
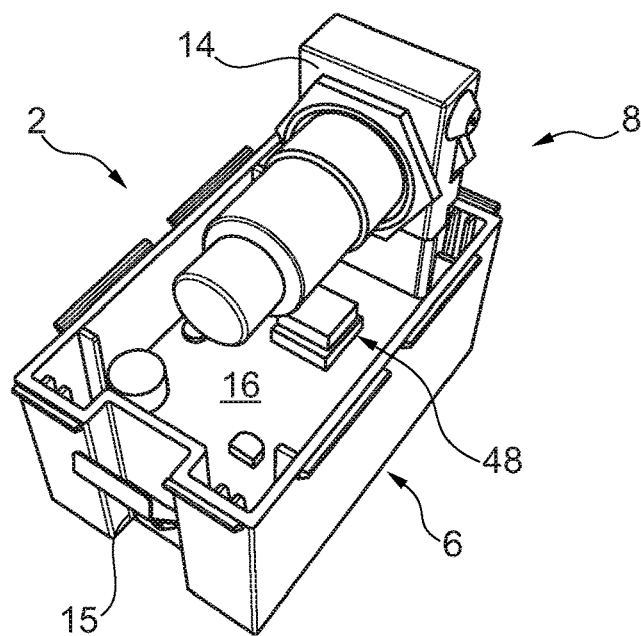
FIG. 4 shows the display device in a partly taken apart illustration.

FIG. 4 further shows the display device 2 in a partly taken-apart arrangement, wherein an inertial measurement unit 48 that is integrated into the electronics unit 16 is identifiable here, said inertial measurement unit 48 being able to detect the movement of the display device 2 and hence of the aircraft. By evaluating concise events, such as, for instance, a landing impact and a subsequent great reduction in the longitudinal speed as a result of braking and a subsequent unchanging elevation, it is possible to unambiguously determine that the aircraft is situated on the ground. This event can trigger an armed signal which initiates the activation of monitoring the region in front of the door 24.

Figure 5:
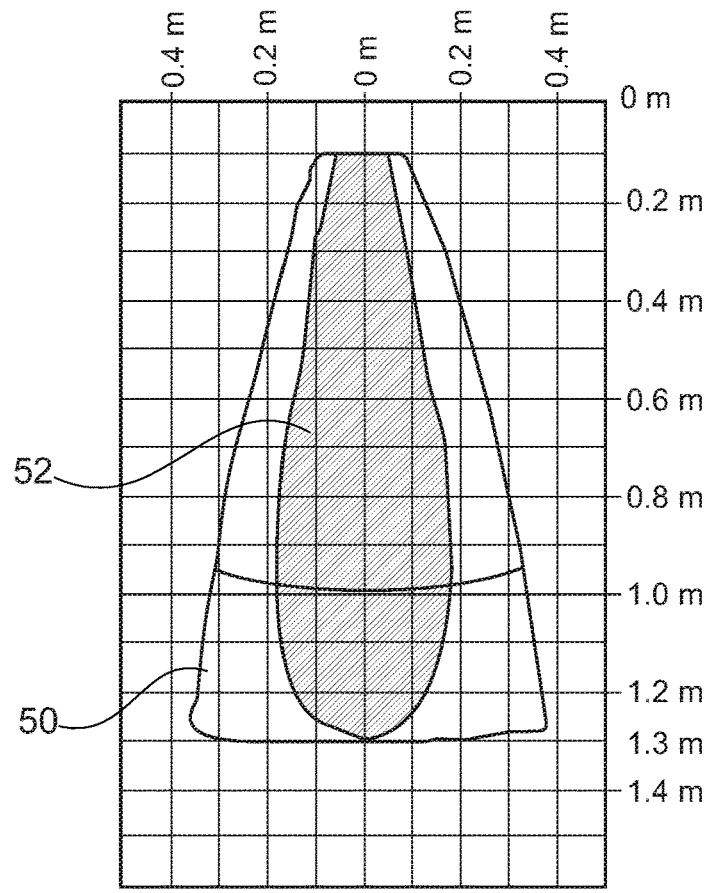
FIG. 5 shows possible sound lobes of an ultrasonic sensor.

Further, a diagram in FIG. 5 shows two preferred sound lobes 50 and 52 of the ultrasonic sensor 14, with the sound lobe 50 belonging to an ultrasonic sensor having an aligned plate and the sound lobe 52 belonging to an ultrasonic sensor with a pipe with a diameter of, e.g., 27 mm. For the purposes of precisely identifying directly in front of the ultrasonic sensor a person striding toward the door 24, the sound lobe should be set to be as narrow as possible such that a width of significantly less than one meter and preferably of 0.3 to 0.7 m is achieved. Consequently, the detection region 28 is quite narrow and can mask persons that are laterally further away. The use of an aligned plate facilitates a slightly widened sound lobe 50 in relation to the solution with the pipe.

Figure 6:
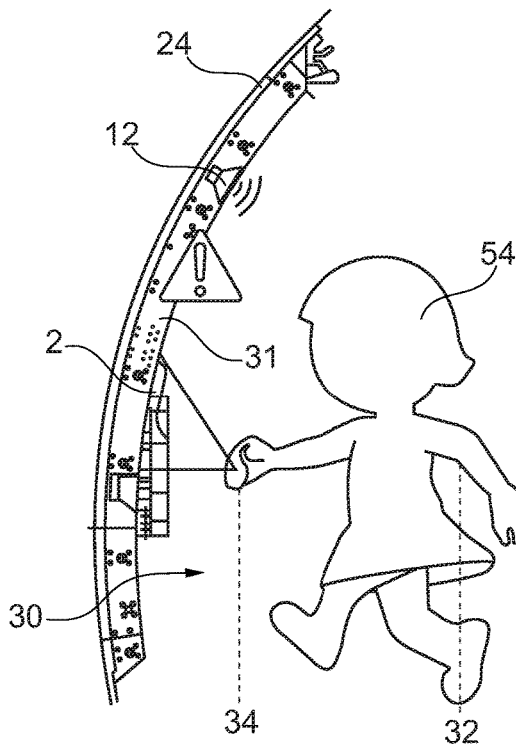
FIG. 6 shows a person situated in front of an aircraft door and a triggered display.

FIG. 6 illustrates a person 54 who is approaching the door 24 and, in the process, has already approached to within the first threshold distance 32 and has reached the second threshold distance. An optical warning and an acoustic warning are simultaneously output, and so the person 54 is clearly warned not to open the door 24 with an emergency slide arming lever 31 in an armed position.

Figure 7:
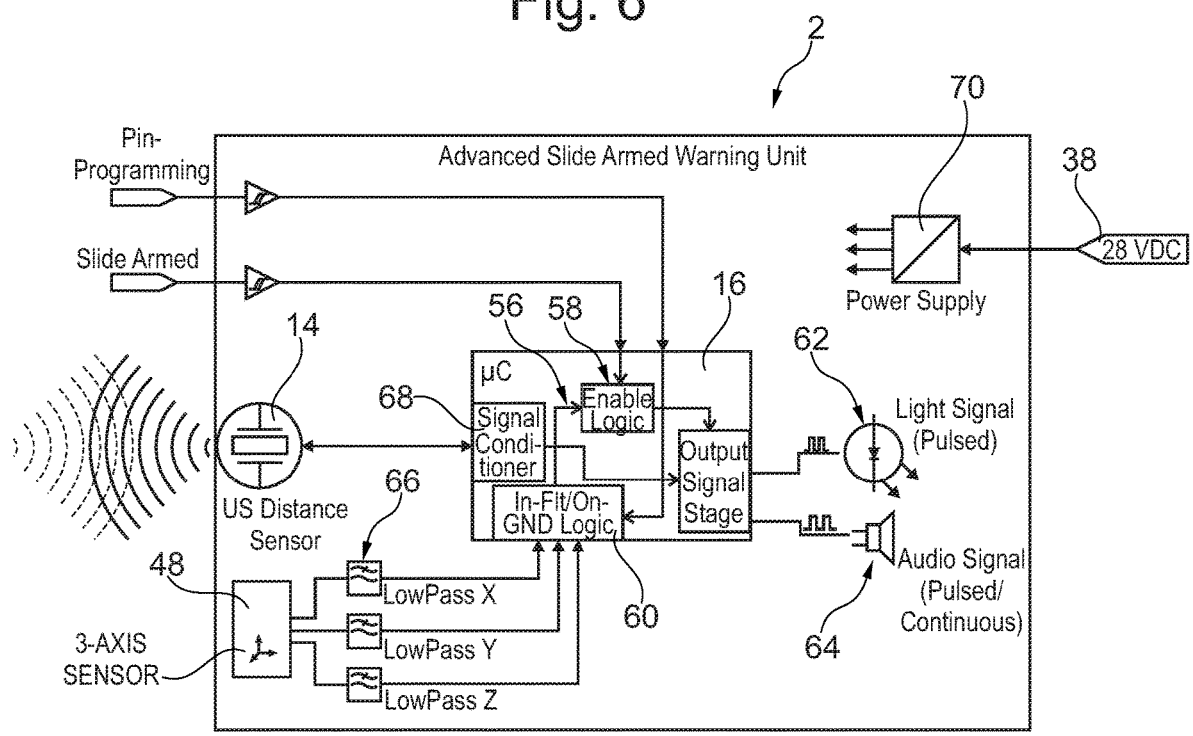
FIG. 7 shows the display device in a schematic, block-based illustration.

Finally, FIG. 7 illustrates an exemplary embodiment of the display device 2 in a schematic, block-based illustration. The ultrasonic sensor 14 and the inertial measurement unit 48 are connected to the electronics unit 16, which, moreover, has two armed signal inputs 56 and 58. The inertial measurement unit 48 can produce an armed signal by way of an appropriate logic circuit 60, said armed signal representing a successful landing, with the armed signal in this case being transmitted to an armed signal input 56. A further armed signal can be transmitted to the second armed signal input, said second armed signal representing an armed state of an emergency slide arming lever. If the aircraft is on the ground and the emergency slide arming lever is in an armed position, monitoring of the detection region 30 is initiated. If an object being situated within at least one threshold distance 32, 34 is determined in the electronics unit 16, optical signaling 62 and/or acoustic signaling 64 is triggered.

It is understood that filters 66 and/or 68 is/are disposed downstream of the inertial measurement unit 48 and the ultrasonic sensor 14, respectively, in order to achieve a desired signal quality. Further, a supply unit 70 is connected to the connector 8. Additionally, a pin-programming unit 72 is connected to, or integrated in, the display device in order, in particular, to specify the alignment of the display device 2 relative to the flight direction.

Additionally, reference is made to the fact that "comprising" does not exclude any other elements or steps and "a" or "one" does not preclude a multiplicity. Further, reference is made to the fact that features described with reference to one of the exemplary embodiments above can also be used in combination with other features of other exemplary embodiments described above. Reference signs in the claims should not be construed as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A display device to display an armed state of an emergency slide in an aircraft, comprising:
   an optical display device to output an optical signal;
   an acoustic signaling device to output an acoustic signal;
   a sensor to detect an approach of a person to the display device; and
   an electronics unit coupled to the optical display device, the acoustic signaling device, and the sensor, the electronics unit configured to operate at least one of the optical display device and the acoustic signaling device when the sensor detects that a person approaches to within at least a predetermined threshold distance;
   wherein the optical display device, the acoustic signaling device, the sensor, and the electronics unit form a contiguous, compact component that is integrable in a door panel of an aircraft door.

2. The display device as claimed in claim 1, further comprising a housing with a fastening region and a viewing side, wherein the fastening region is configured to engage in a mechanical connection with the door panel or a fastening means at the aircraft door.

3. The display device as claimed in claim 1, wherein the sensor is an ultrasonic sensor.

4. The display device as claimed in claim 1, wherein the electronics unit has an armed signal input and is configured to activate or interrupt operation of the optical display device and the acoustic signaling device on the basis of an armed signal that is receivable by way of the armed signal input.

5. The display device as claimed in claim 4, wherein the armed signal input is coupled to a central system of the aircraft and the armed signal is generated and emitted by a central system of the aircraft.

6. The display device as claimed in claim 4, further comprising an inertial measurement unit coupled to the electronics unit and comprising at least one inertial sensor to perform continuous or periodic detection of at least one directed acceleration, wherein the electronics unit is configured to determine whether the aircraft is on the ground from the detected at least one directed acceleration.

7. The display device as claimed in claim 1, wherein the electronics unit is configured to operate the optical display device when a person approaches to within a first threshold distance and operate the acoustic signaling device when a person approaches to within a second threshold distance, and wherein the first threshold distance is greater than the second threshold distance.

8. A method for displaying an armed state of an emergency slide in an aircraft with a display device comprising an optical display device to emit an optical signal, an acoustic signaling device to emit an acoustic signal, a sensor to detect an approach of a person to the display device and an electronics unit coupled to the optical display device, the acoustic signaling device, and the sensor, wherein the optical display device, the acoustic signaling device, the sensor, and the electronics unit form a contiguous, compact component, which is integrable in a door panel of an aircraft door, the method including the steps of:
   detecting a distance of a person from the display device in the door panel of the aircraft;
   comparing the detected distance to at least one threshold distance; and
   operating at least one of the optical display device and the acoustic signaling device as soon as the at least one threshold distance is undershot.

9. The method as claimed in claim 8, wherein the optical display device is operated when a person approaches to within a first threshold distance, the acoustic signaling device is operated when a person approaches to within a second threshold distance, and the first threshold distance is greater than the second threshold distance.

10. The method as claimed in claim 8, wherein the electronics unit suppresses the operation of the at least one optical display device and the acoustic signaling device as soon as no armed signal is received at an armed signal input.

11. The method as claimed in claim 8, further comprising the steps of:
   continuously or periodically detecting at least one directed acceleration by way of an inertial measurement unit coupled to the electronics unit and comprising at least one inertial sensor;
   determining whether the aircraft is on the ground from the detected at least one directed acceleration;
   producing an armed signal when the determining determines that the aircraft is on the ground; and
   transmitting the armed signal to an armed signal input of the electronics unit.

12. An aircraft comprising:
   an aircraft fuselage;

an opening arranged in the aircraft fuselage, the opening being closable by an aircraft door; and a display device comprising:
- an optical display device to output an optical signal;
- an acoustic signaling device to output an acoustic signal;
- a sensor to detect an approach of a person to the display device; and
- an electronics unit coupled to the optical display device, the acoustic signaling device, and the sensor, the electronics unit configured to operate at least one of the optical display device and the acoustic signaling device when the sensor detects that a person approaches to within at least a predetermined threshold distance.

* * * * *